United States Patent
Rho et al.

(10) Patent No.: US 10,476,291 B2
(45) Date of Patent: Nov. 12, 2019

(54) WEARABLE DEVICE HAVING FLEXIBLE BATTERY

(71) Applicant: AMOGREENTECH CO., LTD., Gimpo-si (KR)

(72) Inventors: Seung Yun Rho, Hwaseong-si (KR); Won Gil Choi, Gunpo-si (KR); Ji Hyun Nam, Cheonan-si (KR)

(73) Assignee: AMOGREENTECH CO., LTD., Gimpo-si (KR)

( * ) Notice: Subject to any disclaimer, the term of this patent is extended or adjusted under 35 U.S.C. 154(b) by 328 days.

(21) Appl. No.: 15/105,233

(22) PCT Filed: Dec. 29, 2014

(86) PCT No.: PCT/KR2014/012978
§ 371 (c)(1),
(2) Date: Jun. 16, 2016

(87) PCT Pub. No.: WO2015/099514
PCT Pub. Date: Jul. 2, 2015

(65) Prior Publication Data
US 2017/0005504 A1    Jan. 5, 2017

(30) Foreign Application Priority Data

Dec. 27, 2013 (KR) .......................... 10-2013-0165721
Dec. 29, 2014 (KR) .......................... 10-2014-0191669

(51) Int. Cl.
*H02J 7/02* (2016.01)
*H01M 2/10* (2006.01)
(Continued)

(52) U.S. Cl.
CPC .............. *H02J 7/025* (2013.01); *G04C 10/00* (2013.01); *G04G 17/04* (2013.01); *G04G 17/06* (2013.01);
(Continued)

(58) Field of Classification Search
CPC ...................................... H02J 7/025
USPC .............................................. 320/108
See application file for complete search history.

(56) References Cited

U.S. PATENT DOCUMENTS 5,591,540 A * 1/1997 Louie ...................... B32B 27/32
429/163
5,889,737 A * 3/1999 Alameh ................. G04C 10/00
368/204
(Continued)

FOREIGN PATENT DOCUMENTS

JP    2003306819    10/2003
KR    19990028636    4/1999
(Continued)

OTHER PUBLICATIONS

International Search Report—PCT/KR2014/012978 dated Mar. 12, 2015.

*Primary Examiner* — Jerry D Robbins
(74) *Attorney, Agent, or Firm* — Cantor Colburn LLP (57) ABSTRACT

Provided is a wearable device having a flexible battery, and the wearable device includes: a functional unit; a band unit that fixes the functional unit to a wrist of a user; and a thin plate flexible battery that is embedded in the band unit and supplies power to the functional unit.

17 Claims, 7 Drawing Sheets

(51) Int. Cl.
*G04G 19/00* (2006.01)
*H02J 7/00* (2006.01)
*H02J 50/12* (2016.01)
*G04C 10/00* (2006.01)
*G04G 17/04* (2006.01)
*G04G 17/06* (2006.01)
*A44C 5/00* (2006.01)

(52) U.S. Cl.
CPC .......... *G04G 19/00* (2013.01); *H01M 2/1061* (2013.01); *H01M 2/1066* (2013.01); *H02J 7/0045* (2013.01); *H02J 50/12* (2016.02); *A44C 5/0007* (2013.01)

(56) References Cited

U.S. PATENT DOCUMENTS

| | | | | | |
|---|---|---|---|---|---|
| 6,528,204 | B1* | 3/2003 | Hikmet | .................. | H01M 4/13 429/128 |
| 7,709,139 | B2* | 5/2010 | White | .................... | H01M 4/131 29/623.5 |
| 8,908,479 | B2* | 12/2014 | Teng | ..................... | G04G 19/00 368/204 |
| 2009/0280861 | A1* | 11/2009 | Khan | .................. | H04B 1/3827 455/556.1 |
| 2012/0244408 | A1* | 9/2012 | Huang | ................ | H01M 2/1061 429/127 |
| 2014/0323042 | A1* | 10/2014 | Lee | .......................... | H04B 5/00 455/41.1 |
| 2014/0378853 | A1* | 12/2014 | McKinney | ......... | A61B 5/02438 600/509 |

FOREIGN PATENT DOCUMENTS

| | | |
|---|---|---|
| KR | 100672444 | 1/2007 |
| KR | 20090100684 | 9/2009 |
| KR | 20110128433 | 11/2011 |
| KR | 20130094126 | 8/2013 |

* cited by examiner

WEARABLE DEVICE HAVING FLEXIBLE BATTERY

TECHNICAL FIELD

The present invention relates to a wearable device, and more particularly, to a wearable device having a thin plate flexible battery that is not deformed during bending, has excellent reliability, and can increase duration of use.

BACKGROUND ART

In recent years, technology is rapidly developing in the digital industry and new products different from existing products, such as wearable devices have been released.

There are various kinds of wearable devices such as various types of glasses, wrist watches/wristband units, shoes/insoles, rings, waist belts, arm band units, necklaces, ear sets, clothing, and badges. Smart band units and smart watches worn on the wrist form the largest group of products.

Korean Patent Registration No. 672444 disclosed a watch phone apparatus including: a watch phone having a mobile communication terminal that is implemented in a watch formed; a watch strap that secures the watch phone on a wrist of a user; a first battery that is provided in the watch phone and for supplying power to the watch phone; a second battery that is provided in the watch strap and for supplying power to the watch phone; and a charging terminal that is provided in a portion where the watch strap is tied and for charging at least one of the first and second batteries. However, Korean Patent Registration No. 672444 disclosed that only a lithium ion (Li-ion) or lithium polymer (Li-polymer) battery was applied for the second battery located in the watch strap, but did not specifically present the structure of the second battery.

DISCLOSURE

Technical Problem

To solve the above problems or defects, it is an object of the present invention to provide a wearable device such as a smart watch that can prolong duration of use by including a band unit having a built-in thin plate flexible battery that is not deformed even when performing repetitive bending.

It is another object of the present invention to provide a wearable device having a flexible battery of an excellent reliability, by using a flexible electrode having excellent flexibility and ion conductivity, and also employing an exterior material having an excellent function of preventing moisture penetration.

It is still another object of the present invention to provide a wearable device having a flexible battery that can prolong duration of use of an electronic device such as a smart watch, by thinning the flexible battery and thus maximizing a battery capacity per unit volume.

It is a further object of the present invention to provide a wearable device having a flexible battery with ease of use and administration by charging the flexible battery built in a band unit in a wireless charging method.

Technical Solution

To accomplish the above and other objects of the present invention, according to an aspect of the present invention, there is provided a wearable device having a flexible battery according to an embodiment of the present invention, the wearable device comprising: a functional unit; a band unit that fixes the functional unit to a wrist of a user; and a thin plate flexible battery that is embedded in the band unit and supplies power to the functional unit.

The flexible battery may comprise: an electrode assembly including a positive electrode, a negative electrode, and a separator; an electrolyte; and a packaging member that seals the electrode assembly and the electrolyte, wherein the packaging member is configured by sequentially laminating a heat-sealable layer and a protective layer outwardly from an inner side of the packaging member.

In addition, the packaging member may further comprise a strength reinforcing layer bonded to the protective layer under the adhesion of an adhesive layer.

The protective layer may be one of PTFE (polytetrafluoroethylene), nylon, PP (polypropylene), PET (polyethylene terephthalate), PVDC (polyvinylidene chloride), PE (polyethylene), PVC (polyvinyl chloride), and EVOH (ethylene vinyl alcohol), the heat-sealable layer may be a single layer structure of one of CPP (casting polypropylene), LLDPE (linear low density polyethylene), LDPE (low density polyethylene), HDPE (high density polyethylene), polyethylene, polyethylene terephthalate, polypropylene, EVA (ethylene vinyl acetate), an epoxy resin, and a phenol resin, or a laminate structure thereof, and the strength reinforcing layer may be PET.

In addition, the flexible battery may be insert molded and built in the band unit, or may be built in the band unit, by configuring the band unit to be separated into upper and lower portions, inserting the flexible battery between the upper and lower portions of the band unit, and attaching the upper and lower portions of the band unit.

The functional unit may be a smart watch that performs a camera function, a voice command and memo function, a music function, a clock function, and functions such as texts and phone calls, in connection with a smart phone.

Meanwhile, in some embodiments of the present invention, a main battery may be configured to be mounted in the functional unit, and the flexible battery may be configured to be used as a secondary battery to charge the main battery. However, the flexible battery may be configured to supply power directly to the functional unit. In this case, since it is possible to remove the main battery from the functional unit, it is possible to thin the thickness of the functional unit.

A structure of connecting and fastening the functional unit with the band unit in some embodiments of the present invention may have the following various embodiments.

The structure of connecting and fastening the functional unit with the band unit is configured so that a positive terminal and a negative terminal of the flexible battery are protruded as male terminals at the end of the band unit, and female terminals to be coupled to the male terminals are formed in the functional unit.

Otherwise, the structure of connecting and fastening the functional unit with the band unit is configured to comprise: a connector that is connected to a positive terminal and a negative terminal of the flexible battery, and that is projected into one end of the band unit; and a socket into which the connector is inserted and which is formed in the functional unit to be electrically connected with the connector.

Alternatively, the structure of connecting and fastening the functional unit with the band unit is configured to comprise: a connector that is connected to a positive terminal and a negative terminal of the flexible battery, and that is projected into the other end of the band unit in which one end of the band unit is fixed to one end of the functional unit;

and a socket into which the connector is inserted and which is formed in the functional unit to be electrically connected with the connector.

As being the case described above, the connector may be used as a charging terminal for charging the flexible battery.

Meanwhile, in some embodiments of the present invention, a wireless power receiving antenna device may be mounted in the flexible battery or the band unit in order to charge the flexible battery in a wireless charging method.

Further, in some embodiments of the present invention, a recess for detachably fixing the functional unit is formed in the band unit, in which the functional unit may be attached to and detached from the recess formed in the band unit in an up-and-down (or vertical) direction or in a sliding manner.

Advantageous Effects

As described above, according to the present invention, since a high capacity of a thin plate flexible battery is built in a band unit for wearing a wearable device on a wrist or the like of a user, the flexible battery may be used as a secondary battery to charge a main battery, or as a battery for supplying power directly to the wearable device, to thus extend duration of use of the wearable device.

According to the present invention, a packaging member for sealing the flexible battery incorporated in the band unit includes a protective layer including PTFE of excellent chemical resistance, abrasion resistance, heat resistance, and flexibility, to thereby implement a product conforming to characteristics of a wearable device whose reliability is maintained even in harsh environments, such as repeated bending or water penetration.

Further, according to the present invention, the flexible battery built in the band unit may be charged in a wireless charging mode, to thus make it easy to use the flexible battery, and thus accessories such as jacks, charging cables, or the like that are required in a wired charging mode are unnecessary, to thereby provide an effect of easily managing a wearable device.

BEST MODE

Hereinafter, a wearable device having a flexible battery according to embodiments of the present invention will be described with reference to the accompanying drawings. In the process, the sizes and shapes of components illustrated in the drawings may be shown exaggerated for convenience and clarity of explanation. Further, by considering the configuration and operation of the present invention, the specifically defined terms may be changed according to user's or operator's intention, or the custom. Definitions of these terms herein need to be made based on the contents across the whole application.

Figure 1:
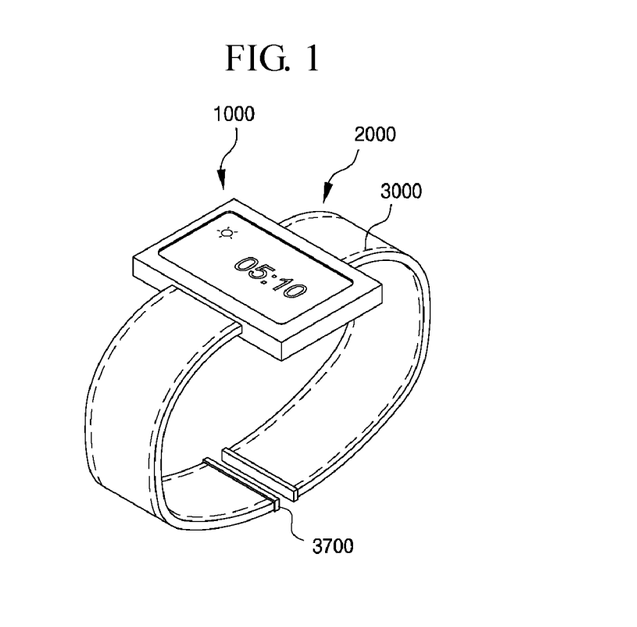
FIG. 1 is a conceptual perspective view of a smart watch illustrating an example of a wearable device having flexible battery according to the present invention.

Referring to FIG. 1, a wearable device having a flexible battery according to an embodiment of the present invention includes: a functional unit 1000, a band unit 2000; and a flexible battery 3000.

That is, a smart watch that is an example of the wearable device having the flexible battery according to the embodiment of the present invention includes: the functional unit 1000; the band unit 2000 that fixes the functional unit 1000 to a wrist of a user; and a thin plate flexible battery 3000 that is embedded in the band unit 2000 and supplies power to the functional unit 1000.

In this case, the flexible battery 3000 may be insert molded and embedded in the band unit 2000.

Then, the band unit 2000 includes a coupling unit 3700 (schematically shown in FIG. 1) that may be formed in a variety of structures so that a user may wear a wearable device on a wrist.

The functional unit 1000 includes a variety of functions such as a camera function, a voice command and memo function, and a music function, in addition to a clock function. In addition, the functional unit 1000 may be defined as a body that may include a smart phone function and a function interworking with a smart phone, including text and phone calls. Components including a packaging case, a display exposed from the packaging case, and a drive unit that drives the display and the wearable device are built in the functional unit 1000.

The band unit 2000 has a structure that the flexible battery 3000 is built in an inside of a packaging member having aesthetic appearance. The flexible battery 3000 built in the band unit 2000 supplies power to components that require power among components incorporated in the functional unit 1000.

Here, a main battery that applies power to the component may be mounted in the functional unit 1000. In this case, the flexible battery 3000 may be used as an auxiliary battery. The main battery and the flexible battery 3000 may be connected in series to or in parallel with each other. Here, when a flexible battery is built in the band unit 2000, the main battery and the flexible battery may be configured to be connected in series to each other. When a plurality of flexible batteries are built in the band unit 2000, the main battery and the plurality of flexible batteries may be configured to be connected in series to or in parallel with each other, to thus increase duration of use of the wearable device.

In some embodiments, since the flexible battery 3000 having excellent flexibility is built in the band unit 2000, a user may feel improved wearability due to excellent flexibility when the user wears the band unit 2000 on a wrist of the user.

Figure 2:
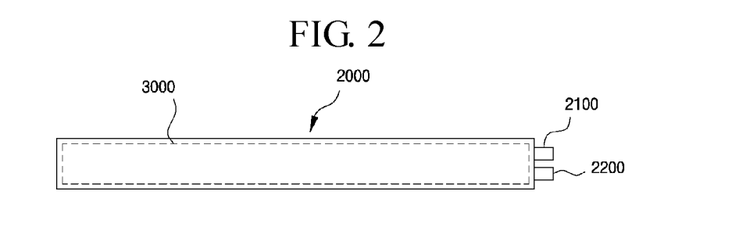
FIG. 2 is a view showing a state in which a flexible battery is incorporated in a band unit of a wearable device according to the present invention.

Referring to FIG. 2, the above-mentioned flexible battery 3000 is embedded in the band unit 2000. Here, the band unit 2000 may be configured so that a positive terminal 2100 and a negative terminal 2200 of the flexible battery 3000 are projected to one end of the band unit 2000. A positive terminal 2100 and a negative terminal 2200 of the flexible battery are protruded as male terminals at the end of the band unit 2000, and female terminals that are coupled to the positive terminal 2100 and the negative terminal 2200 of the flexible battery are formed in the functional unit 1000. That is, since the male terminals are protrudingly formed in the band unit 2000 and the female terminals are recessedly formed in the functional unit 1000, the male terminals are electrical connected with the female terminals.

Figure 3:
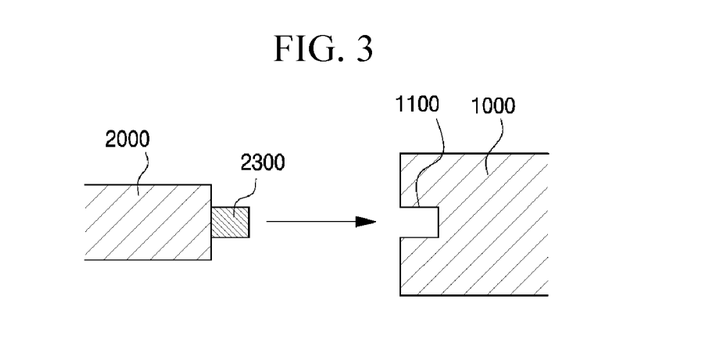
FIG. 3 is a conceptual partial cross-sectional view showing a coupling relationship between a functional unit and a band unit with a built-in flexible battery in a wearable device according to the present invention.

Referring to FIG. 3, in some embodiments of the present invention, a connector 2300 is projected from one end of the band unit 2000 in which the connector 2300 is connected to the positive terminal and the negative terminal of the flexible battery, and the functional unit 1000 is configured such that the connector 2300 is inserted into and electrically connected with a socket 1100 in the functional unit 1000. In this case, the connector 2300 of the band unit 2000 is inserted into the socket 1100 of the functional unit 1000, and thus the power of the flexible battery is applied to the functional unit 1000 via the connector 2300 and the socket 1100. In addition, electrical wirings (e.g., FPCB (flexible printed circuit board)) that may be applied to components of the functional unit 1000 may be disposed within the functional unit 1000.

In some embodiments of the present invention, the connector 2300 may be configured to be used as a charging terminal for charging the battery flexible.

Figure 4:
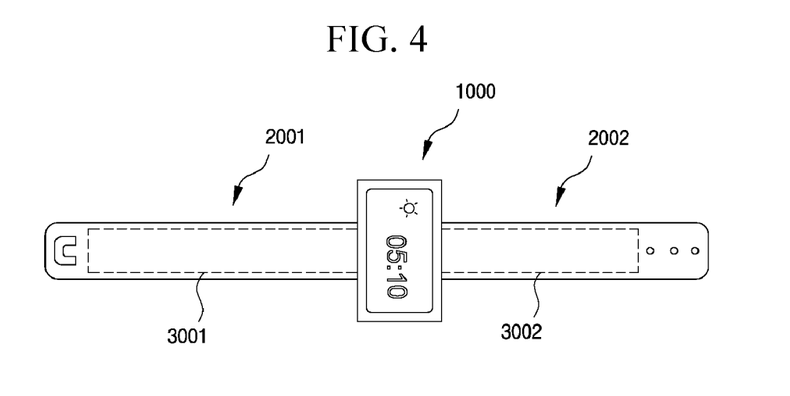
FIG. 4 is a schematic view showing an example of a structure of wearing a smart watch on a wrist of a user, the smart watch being an example of a wearable device according to the present invention.

As shown in FIG. 4, in some embodiments of the present invention, a band unit may be configured to include a first band unit 2001 that is coupled to one end of the functional unit 1000; and a second band unit 2002 that is coupled to the other end of the functional unit 1000. A first flexible battery 3001 may be embedded in the first band unit 2001, and a second flexible battery 3002 may be embedded in the second band unit 2002.

In addition, although not shown, the band unit may be formed integrally with the functional unit 1000. In this case, a flexible battery may be embedded in the band unit.

Figure 5:
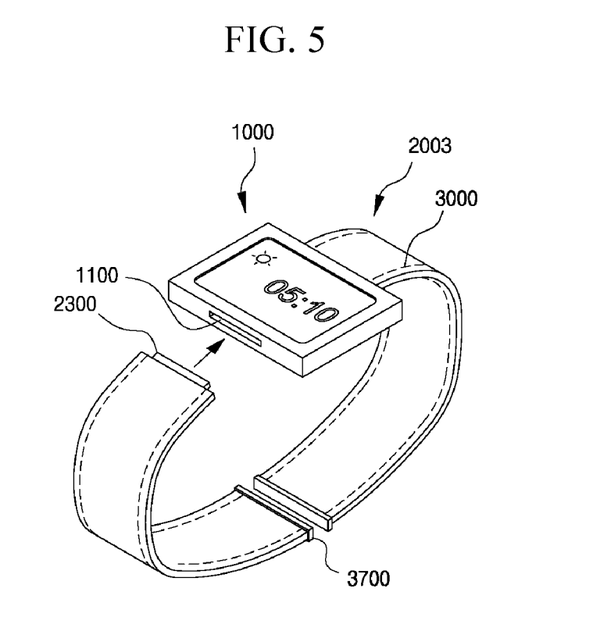
FIG. 5 is a schematic view showing another example of a structure of wearing a smart watch on a wrist of a user, the smart watch being an example of a wearable device according to the present invention.

Referring to FIG. 5, a separable band unit 2003 separated from the functional unit 1000 may be also applied in some embodiments of the present invention.

Here, one end of the band unit 2003 may be fixed to one end of the functional unit 1000, and electrodes of the flexible battery 3000 may be electrically connected to components of the functional unit 1000. In addition, the other end of the band unit 2003 may be inserted into an insertion hole of the functional unit 1000.

Otherwise, one end of the functional unit 1000 may be fixed to only one end of the band unit 2003, and a connector 2300 connected with the electrodes of the flexible battery 3000 built in the band unit 2003 may be inserted in the socket 1100 of the functional unit 1000.

The above-described coupling relationship between the band unit and the functional unit 1000 may be variously modified, but is not limited to the coupling structures proposed in the present invention.

Figure 6A:
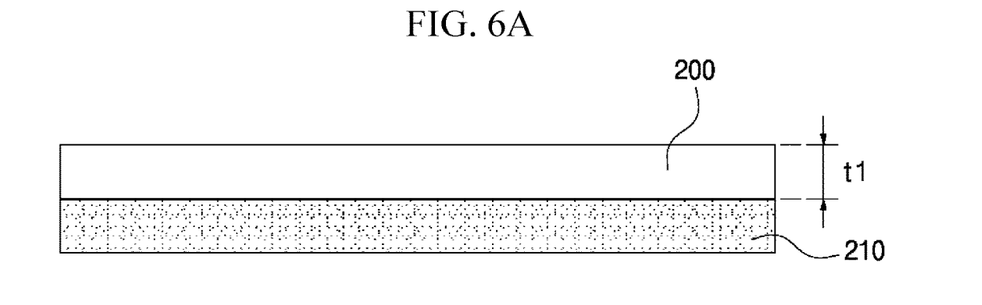
FIGS. 6A and 6B are enlarged cross-sectional views respectively illustrating a layer structure of a packaging member constituting a pouch of a flexible battery applied to the present invention.

Referring to FIG. 6A, a packaging member of a pouch of a flexible battery according to an embodiment of the present invention includes a protective layer 200 and a heat-sealable layer 210.

The protective layer 200 is made of a material of excellent chemical resistance, abrasion resistance, heat resistance, and flexibility. Thus, the packaging member of the pouch of the flexible battery according to the embodiment of the present invention may prevent penetration of moisture from the outside, and may withstand heat generated by operation of the flexible battery. In addition, the pouch is not deformed for a bending to thus improve the flexibility characteristic of the flexible battery.

The thickness t1 of the protective layer 200 is preferably 1 μm to 500 μm. If the thickness t1 of the protective layer 200 is less than 1 μm, a large amount of water penetrated from the outside of the pouch makes it difficult to maintain characteristics of the flexible battery. When the thickness t1 is greater than 500 μm, the thickness of the packaging member of the pouch is thick to thereby cause the bending characteristic to be lowered.

First and second packaging members are thermally fused at the side edges of the first and second packaging members, and the heat-sealable layer 210 of each of the first and second packaging members is then heat-sealed to thermally fuse the first and second packaging members. The heat-sealable layer 210 is laminated on the protective layer 200.

The protective layer 200 may employ PTFE (polytetrafluororthylene), nylon, PP (polypropylene), PET (polyethylene terephthalate), PVDC (polyvinylidene chloride), PE (polyethylene), PVC (polyvinyl chloride), and EVOH (ethylene vinyl alcohol). In particular, it is preferable to use PTFE which is a thin film and has excellent wear resistance, heat resistance, and flexibility, as the protective layer 200.

The heat-sealable layer 210 may employ a polymer resin having good sealing properties, in particular, may adopt a single layer structure of one of CPP (casting polypropylene), LLDPE (linear low density polyethylene), LDPE (low density polyethylene), HDPE (high density polyethylene), polyethylene, polyethylene terephthalate, polypropylene, EVA (ethylene vinyl acetate), an epoxy resin, and a phenol resin, or a laminate structure thereof.

Figure 6B:
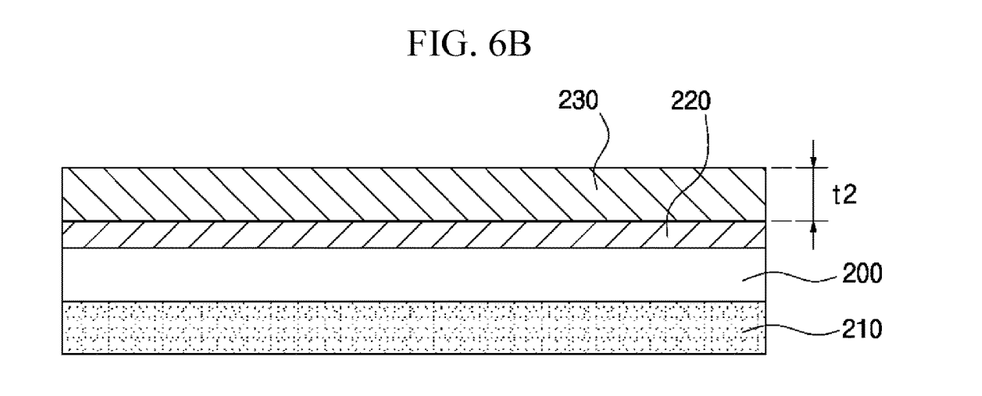

Referring to FIG. 6B, in some embodiments of the present invention, the packaging member of the pouch may include a protective layer 200, a heat-sealable layer 210, an adhesion layer 220, and a strength reinforcing layer 230.

That is, the packaging member of the pouch of FIG. 6B has a structure in which the strength reinforcing layer 230 is bonded on the protective layer 200 of the packaging member of the pouch of FIG. 6A via an adhesive layer 220. That is, the packaging member of the pouch of FIG. 6A includes only the protective layer 200, to thus exhibit excellent flexibility, but slightly lower strength, to thereby cause wrinkles to be formed on a pouch sealing surface. Therefore, in FIG. 6B, the packaging member of the pouch further includes the strength reinforcing layer 230. Here, the strength reinforcing layer 230 is preferably PET.

The thickness t2 of the strength reinforcing layer 230 is preferably 1 µm to 500 µm. Here, if the thickness t2 of the strength reinforcing layer 230 is 1 µm, the strength is not reinforced due to the thin thickness, and if the thickness t2 of the strength reinforcing layer 230 is greater than 500 µm, warping property is low due to the thick thickness.

Thus, although the packaging member does not include an aluminum thin film, the pouch according to an embodiment of the present invention may have excellent characteristics of the pouch, and prevent wrinkles that can be formed during bending, to thus provide an advantage to be capable of making excellent aesthetic appearance.

Figure 7:
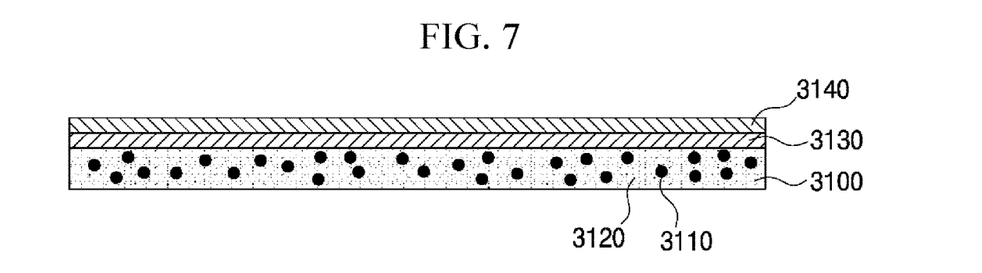
FIG. 7 is a cross-sectional view schematically showing a flexible electrode assembly of a flexible battery applied to the present invention.

The flexible electrode assembly may employ a structure in which a positive electrode active material layer is formed on a positive electrode or a structure in which a negative electrode active material layer is formed on a negative electrode. As shown in FIG. 7 which will be described later, the flexible electrode assembly may employ a structure of a flexible electrode assembly structure in which an active material slurry is filled in pores of a porous conductive support.

Referring to FIG. 7, the flexible electrode assembly of the flexible battery applied to an embodiment of the present invention includes: a porous substrate 3100 having a plurality of pores; metal particles 3110 coated on the plurality of pores of the porous substrate 3100; an active material slurry 3120 that is filled in the pores coated with the metal particles 3110 in the porous substrate 3100; a conductive adhesive layer 3130 formed on the porous substrate 3100; and a conductive metal layer 3140 formed on the conductive adhesive layer 3130.

The porous substrate 3100 is preferably implemented as a porous nanofiber web or nonwoven fabric having fine pores by nanofibers that are formed by a process of dissolving a polymer that is capable of being electrospun in a solvent to thus form a spinning solution, and then electrospinning the spinning solution on a collector or a transfer sheet, to thus obtain the spun nanofibers.

Here, the porous nanofiber web may be formed by electrospinning a single type of a polymer or a mixed spinning solution that is formed by mixing at least two kinds of polymers to then be dissolved in a solvent, or by cross-spinning a spinning solution that is formed by dissolving different polymers in respectively different solvents through respectively different spinning nozzles.

For example, the porous nanofiber web is formed by using nanofibers with a diameter of 0.3 to 1.5 µm, and the thickness of the porous nanofiber web is set to 5 to 1000 µm, preferably 80 µm. The size of the fine pores is set to several tens of µm, and the porosity thereof is set to 5 to 90%.

In this case, the porous substrate 3100 may employ only a porous nonwoven fabric alone, or a lamination of a porous nonwoven fabric and a porous nonwoven fabric to reinforce the strength of the support as needed. For example, the porous nonwoven fabric is any one of a nonwoven fabric made of PP/PE fibers of a double structure where PE is coated on an outer periphery of a PP fiber as a core, a PET nonwoven fabric made of polyethylene terephthalate (PET) fibers, and a nonwoven fabric made of cellulose fibers. The thickness of the porous nonwoven fabric is set to 5 to 1000 µm.

To form the porous substrate 3100 as a conductive support, the metal particles 3110 coated on the fine pores of the porous substrate 3100 are metal particles deposited by a sputtering process. The metal particles 3110 may include all metals of high electrical conductivity as an electrode current collector, taking a full advantage of metals, for example, such as nickel (Ni), copper (Cu), stainless steel (SUS), titanium (Ti), chromium (Cr), manganese (Mn), iron (Fe), cobalt (Co), zinc (Zn), molybdenum (Mo), tungsten (W), silver (Ag), gold (Au), and aluminum (Al) that may be used for the sputtering process.

Then, the active material slurry 3120 is defined as a slurry containing the active material, and the active material slurry 3120 is prepared by using a slurry that is formed of a mixture including a suitable amount of an active material, a conductive agent, a binder and an organic solvent, and the active material slurry 3120 may further include PTFE (polytetrafluoroethylene) to improve the flexibility of the electrodes.

Here, the active material includes a positive electrode active material or a negative electrode active material for a lithium ion flexible battery or a lithium polymer flexible battery. The positive electrode active material is capable of reversibly intercalating and de-intercalating lithium ions, and the negative electrode active material is capable of intercalating and de-intercalating lithium ions.

Therefore, in some embodiments of the present invention, a lithium ion flexible battery or a lithium polymer flexible battery may be configured by using a flexible electrode assembly.

In addition, in some embodiments of the present invention, the flexible electrode assembly is configured by forming a conductive adhesive layer 3130 on one surface of the porous substrate 3100 and forming a conductive metal layer 3140 on the surface of the conductive adhesive layer 3130, in order to further improve the electrical conductivity.

The conductive adhesive layer 3130 is formed to play a role of an adhesive layer and simultaneously ensure conductivity, when forming the conductive metal layer 3140 in an electrolytic plating method or an electroless plating method as a plating method.

In addition, the conductive adhesive layer 3130 is preferably made of the same metal material as the conductive metal layer 3140, and is formed as, for example, 1 µm or less by using a PVD (Physical Vapor Deposition) method such as sputtering, vacuum deposition, and ion plating.

The flexible electrode assembly configured as described above according to the embodiment of the present invention, may ensure the conductivity to thus have the electrical conductivity and simultaneously have good flexibility, because metal particles are coated on a plurality of pores of a porous substrate made of a porous nanofiber web or nonwoven fabric having fine pores by using electrospun nanofibers as the conductive support.

In addition, the flexible electrode assembly according to the embodiment of the present invention may be made into a thin film and may be possible to improve the electrical conductivity, by forming a conductive metal layer through a conductive adhesive layer on the surface of the conductive support, or by forming a conductive metal layer directly on the surface of the conductive support.

Figure 8A:
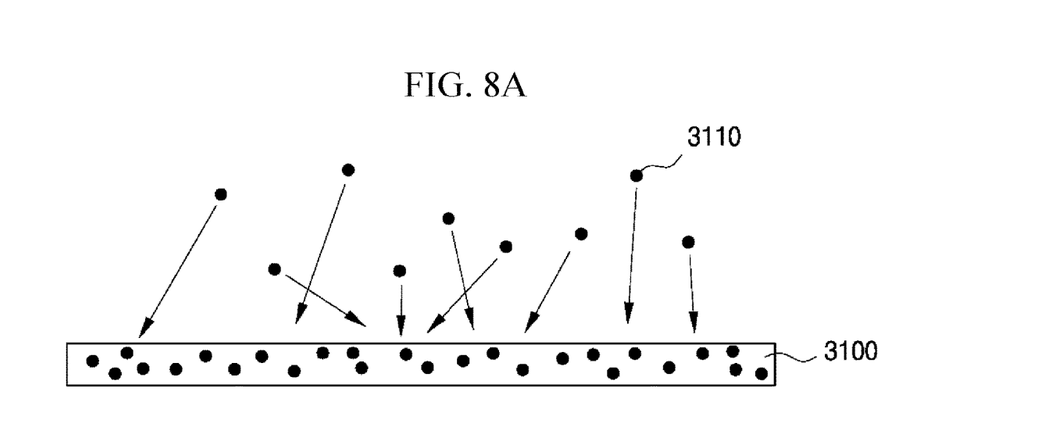
FIGS. 8A through 8C are schematic cross-sectional views for explaining a method of manufacturing a flexible electrode assembly of a flexible battery applied to the present invention.
Figure 8B:
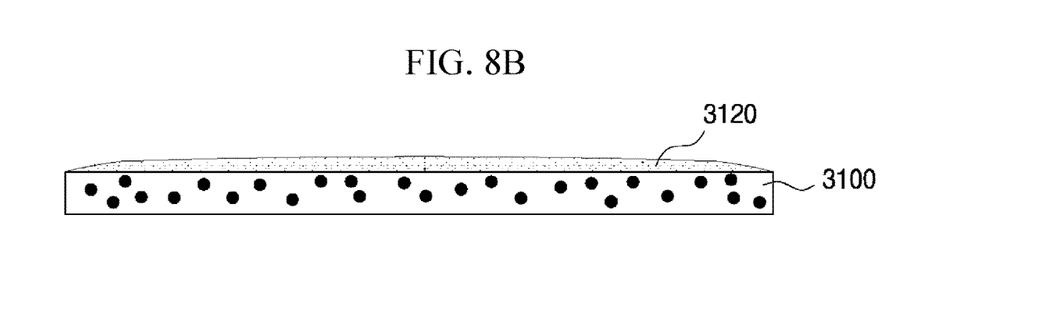
Figure 8C:
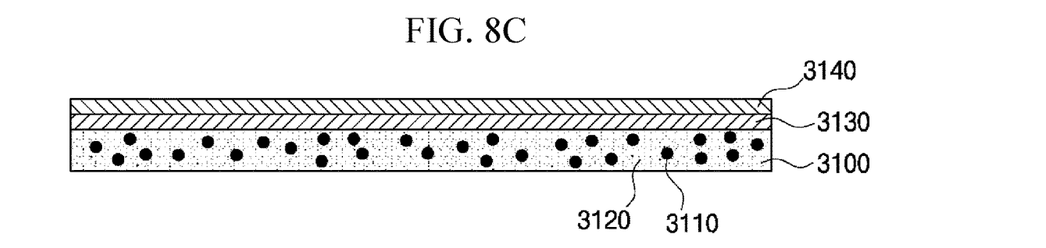

Referring to FIGS. 8A through 8C, a method of manufacturing a flexible electrode assembly of a flexible battery applied to an embodiment of the present invention includes performing a sputtering process to coat a metal on a porous substrate 3100 (FIG. 8A). Here, when the metal is coated on the porous substrate 3100 in the embodiment of the present invention, one of an electroless plating process, an E-spinning process, and an evaporation process other than the sputtering process, or various other processes may be performed.

In the sputtering process, the metal particles 3110 are injected into a plurality of the pores of the porous substrate 3100, and thus the metal particles 3110 are coated on the inner walls of the plurality of the pores. Accordingly, the porous substrate 3100 is given conductivity and is formed into a porous electrode.

Here, since the porous substrate 3100 is provided with a plurality of fine pores, the metal particles 3110 penetrates into the plurality of fine pores by the sputtering process, and thus the metal particles 3110 are coated on the inner walls of the fine pores. Thus, the pores of the porous substrate 3100 after deposition become finer than the pores of the porous substrate 3100 before deposition.

Then, the porous substrate 3100 may be implemented in a laminated structure of one or both selected from a nanofiber web and a nonwoven fabric having fine pores in which nanofibers obtained by electrospinning a polymer material are accumulated.

Meanwhile, a sputtering apparatus includes: a chamber in which a vacuum is typically formed; a heater that is disposed inside the chamber and for heating a metal target to generate metal particles; and a support on which a porous substrate 3100 is put in which the porous substrate 3100 is an object on which the metal particles are deposited.

Thus, as shown in FIG. 8A, when the metal target is heated by the heater, the metal particles 3110 are popped off from the metal target, and the metal particles 3110 are deposited on the porous substrate 3100. Here, the metal particles 3110 are injected onto the inner walls of the pores of the porous substrate 3100 to then be coated thereon.

Figure 9:
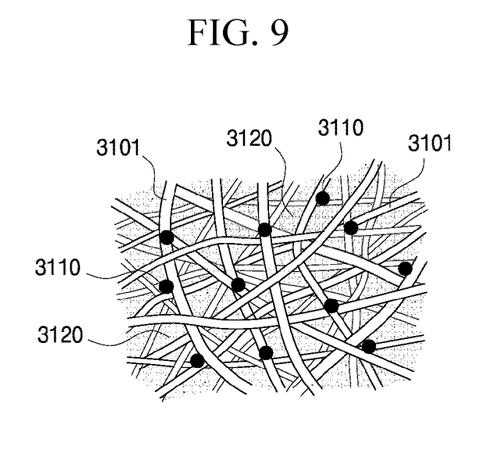
FIG. 9 is a conceptual view for explaining a state of a porous substrate having undergone the process of FIG. 8B.

Then, the active material slurry 3120 is injected into the porous substrate 3100 on which the metal has been coated, thereby filling the active material slurry 3120 in the inside of the plurality of pores of the porous substrate 3100 (FIG. 8B). Therefore, as shown in FIG. 9, the metal particles 3110 are coated on the nanofibers 3101 of the porous substrate 3100, and the active material slurry 3120 is filled into the inside of the pores made in the nanofibers 3101.

Here, the active material slurry 3120 is injected into the plurality of pores of the porous substrate 3100, by using a dipping method, a coating method, and a spraying method.

Then, as shown in FIG. 8C, a metal is coated on the plurality of pores of the porous substrate 3100, and a conductive adhesive layer 3130 is formed on the porous substrate 3100, in which the active material slurry 3120 is injected into the porous substrate 3100, and a conductive metal layer 3140 is formed on the conductive adhesive layer 3130.

A flexible electrode assembly is prepared by performing the above-described processes. That is, in some embodiments of the present invention, electrodes are implemented by applying a flexible porous substrate as an electrode substrate, to thereby obtain excellent flexibility and excellent electrical conductivity.

Figure 10:
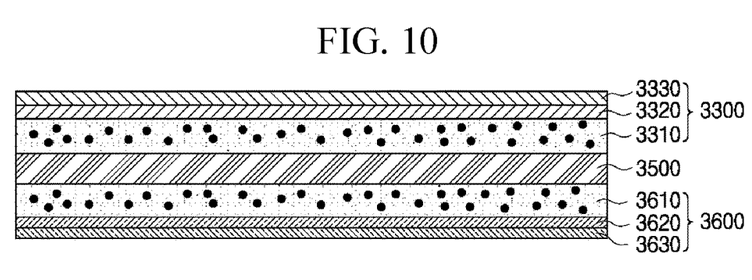
FIG. 10 is a conceptual cross-sectional view of a flexible battery that is configured by using flexible electrodes prepared by the process shown in FIGS. 8A to 8C.

Referring to FIG. 10, a flexible battery that is configured by using a flexible electrode assembly according to an embodiment of the present invention may be configured into a lithium-ion flexible battery or a lithium polymer flexible battery.

When a flexible battery forms a full cell, the flexible battery is made to include a positive electrode 3300, a separator 3500, an electrolyte, and a negative electrode 3600.

The positive electrode 3300 and the negative electrode 3600 are made up of the flexible electrodes according to an embodiment of the present invention described above. That is, the positive electrode 3300 is configured to include a porous substrate 3310 in which a metal is coated on a plurality of pores and an active material slurry is injected into the plurality of pores, a conductive adhesive layer 3320 formed on the porous substrate 3310, and a conductive metal layer 3330 formed on the conductive adhesive layer 3320, and the negative electrode is configured to include a porous substrate 3610 in which a metal is coated on a plurality of pores and an active material slurry is injected into the plurality of pores, a conductive adhesive layer 3620 formed on the porous substrate 3610, and a conductive metal layer 3630 formed on the conductive adhesive layer 3620.

Here, the positive electrode 3300 is disposed so as to face the negative electrode 3600, and the active material slurry injected into the plurality of pores of the porous substrate 3310 in the positive electrode 3300 is arranged to face the active material slurry injected into the plurality of pores of the porous substrate 3610 in the negative electrode 3600, to form a full cell.

The active material slurry is implemented by mixing a predetermined amount of an active material, a conductive agent, a binder, and an organic solvent, and a slurry including $LiCoO_2$, super-P carbon, and PVdF as the active material, the conductive agent, and the binder is applied to the positive electrode 3300, and a slurry including MCMB (mesocarbon microbeads), super-P carbon, and PVdF is applied to the negative electrode 3600.

When a flexible battery constitutes a lithium ion flexible battery, the lithium ion flexible battery is prepared by a process of interposing a separator 3500 between the positive electrode 3300 and the negative electrode 3600, to form an electrode assembly, placing the electrode assembly in a pouch, closing the opening of the pouch, and injecting an electrolytic liquid as an electrolyte.

In this case, the separator 3500 includes a porous polymer web layer that is laminated to one side of a porous nonwoven fabric that plays a support role, and serves as an adhesive layer and an ion moisture-containing layer when the porous polymer web layer is in close contact with opposing electrodes. Some of the porous polymer web layer is depressed in a surface layer of a porous nonwoven fabric so as to block pores of a surface to be laminated with the porous nonwoven fabric. Accordingly, a composite porous separator may be used to lower porosity of the porous nonwoven fabric.

In addition, the separator 3500 includes a non-pore polymer film layer that is laminated to one side of a porous nonwoven fabric that plays a support role, and serves as an adhesive layer and an ion moisture-containing layer when the non-pore polymer film layer is in close contact with opposing electrodes. Some of the non-pore polymer film layer is depressed in a surface layer of a porous nonwoven fabric so as to block pores of a surface to be laminated with the porous nonwoven fabric. Accordingly, a composite porous separator may be used to lower porosity of the porous nonwoven fabric.

In addition, the separator 3500 includes: a porous nonwoven fabric that acts as a support and has a first melting point and a first porosity; a first porous polymer web layer that is laminated on one side of the porous nonwoven fabric, and acts as an adhesive layer when the first porous polymer web layer is in close contact with opposing electrodes; and a second porous polymer web layer that is laminated on the other side of the porous nonwoven fabric, and includes nanofibers of a heat-resistant polymer, wherein the first porous polymer web layer and the second porous polymer web layer may employ a composite porous separator having a shutdown function having a melting point higher than the first melting point of the porous nonwoven fabric, and a porosity equal to or similar to the first porosity thereof.

In addition, the separator 3500 includes: a porous nonwoven fabric that acts as a support and has a first melting point and a first porosity; a non-pore polymer film layer that is laminated on one side of the porous nonwoven fabric, and acts as an adhesive layer when the non-pore polymer film layer is in close contact with opposing electrodes; and a second porous polymer web layer that is laminated on the other side of the porous nonwoven fabric, and includes nanofibers of a heat-resistant polymer, wherein the second porous polymer web layer may employ a composite porous separator having a shutdown function having a melting point higher than the first melting point of the porous nonwoven fabric, and a porosity equal to or similar to the first porosity thereof.

Furthermore, the separator 3500 includes: a first non-pore polymer film layer that is made of a polymer material that is water-swollen in an electrolyte and whose electrolytic ions are conductible; and a porous polymer web layer that is made of a ultra-fine fibrous mixture that is obtained by mixing a heat-resistant polymer with inorganic particles, or mixing a heat-resistant polymer and a water-swellable polymer with inorganic particles, wherein the first non-pore polymer film layer and the porous polymer web layer may be separated and formed on either side of a positive electrode and a negative electrode, respectively, or may be laminated and formed on any one side of the positive electrode and the negative electrode.

In addition, the separator 3500 may employ, without limitation, any separator that may be swollen in an electrolyte and separate a positive electrode and a negative electrode.

When an electrolyte is injected into a pouch that accommodates and seals the electrode assembly, the porous polymer web layer or the inorganic polymer film layer that forms the separator 3500 absorbs the electrolyte and is made gel to then be swollen.

Some of the porous polymer web layer or the inorganic polymer film layer are pushed into entering the inner portions of large pores of the porous nonwoven fabric, to thus block the entrances of the large pores of the porous nonwoven fabric to thereby lower the porosity.

Furthermore, since the porous nonwoven fabric is used as a substrate in some embodiments of the present invention, and one side of the nonwoven fabric is made of a PVDF non-pore polymer film layer, the non-pore polymer film layer having excellent adhesion is in close contact with and assembled with the surface of the negative electrode, to thereby play a role of suppressing dendrite formation.

Meanwhile, when constituting a lithium polymer flexible battery, a polymer electrolyte is inserted between the positive electrode 3300 and the negative electrode 3600. Here, the polymer electrolyte may employ a gel polymer electrolyte or a solid electrolyte.

In this case, the polymer electrolyte may be, for example, formed of a gel polymer portion that is obtained by synthesizing a gel-type gel polymer by polymerization of gel polymer forming monomers via a gelation thermal treatment process in which an organic electrolyte that is obtained by mixing the gel polymer forming monomers with a polymerization initiator is incorporated into a composite porous separator that is formed by laminating a porous polymer web layer or a non-pore polymer film layer made of a plurality of nanofibers with a porous nonwoven fabric.

Meanwhile, the gel polymer portion of the polymer electrolyte may be formed, for example, by synthesizing a gel-type gel polymer by polymerization of gel polymer forming monomers via a gelation thermal treatment process in which an organic electrolyte that is obtained by mixing the gel polymer forming monomers with a polymerization initiator is filled into a pouch at a state where a composite porous separator 3500 is put between the positive electrode 3300 and the negative electrode 3600 and integrated and assembled in the pouch.

The gel polymer forming monomers may employ, for example, methylmethacrylate (MMA) monomers needed to form polymethylmethacrylate (PMMA) by a polymerization reaction.

In some embodiments of the present invention, the polymer electrolyte that forms the gel polymer portion is preferably made of a highly conductive polymer to serve as a passage which carries lithium ions are oxidized or reduced at the negative electrode and the positive electrode at the time of charging and discharging of the flexible battery.

In this case, since the gel polymer forming monomers form a gel-type polymer by a rapid polymerization reaction, the composite porous separator 3500 maintains a web shape.

In some embodiments of the present invention, it is possible to configure a polymer flexible battery by using another type well-known polymer electrolyte and electrodes in addition to the above-described gel-type polymer electrolyte in the embodiments.

In addition, the conductive metal layer and the conductive adhesive layer may be made of a multi-layer structure as well as each a single-layer structure.

Figure 11:
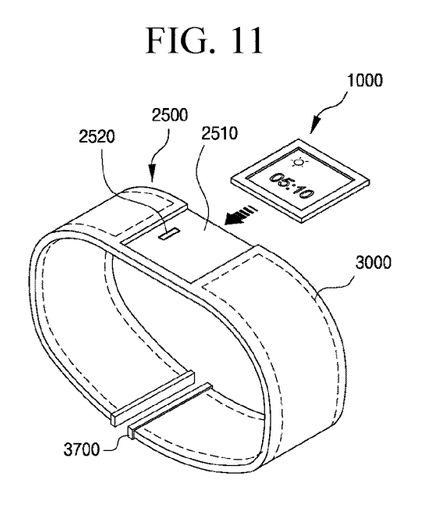
FIG. 11 is a conceptual perspective view for explaining another example of a detachable structure of a functional unit and a band unit in a wearable device according to an embodiment of the present invention.

FIG. 11 is a conceptual perspective view for explaining another example of a detachable structure of a functional unit and a band unit in a wearable device according to an embodiment of the present invention.

Referring to FIG. 11, the wearable device according to this embodiment includes a band unit 2500 having a recess 2510 in which a functional unit 1000 may be mounted in the recess 2510 of the band unit 2500.

Here, a first terminal (not shown) is exposed from the functional unit 1000, and a second terminal 2520 is formed in an inner surface of the recess 2510. When the functional unit 1000 is mounted in the recess 2510, the second terminal 2520 is in electrical contact with the first terminal (not shown) so that power from the flexible battery 3000 is supplied to the functional unit 1000.

A portion of the recess 2510 may be opened so that the functional unit 1000 may be inserted into and mounted with the recess 2510 in a sliding manner.

Such a wearable device is configured so that the functional section 1000 is detachable from the band unit 2500. When the functional unit 1000 is mounted with the band unit 2500, the functional unit 1000 receives power from a flexible battery 3000 of the band unit 2500. When the functional unit 1000 is departed from the band unit 2500, a user may perform a variety of functions including functions of a smart phone by using the functional unit 1000.

Here, the functional unit 1000 may be equipped with a main battery.

Figure 12:
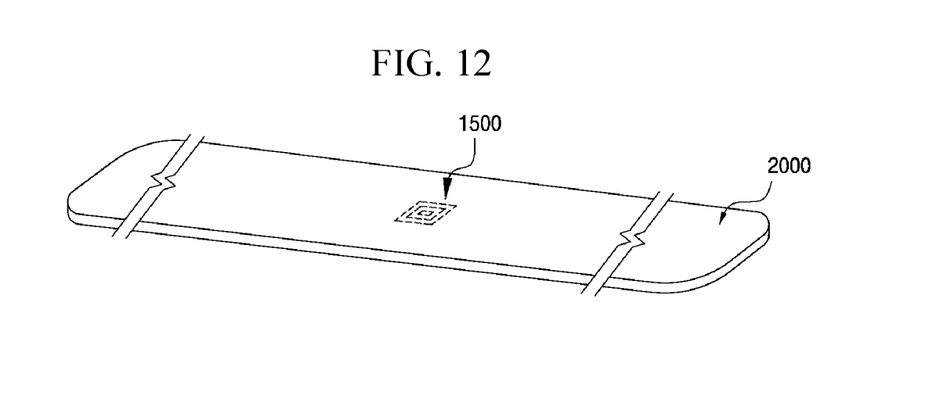
FIG. 12 is a conceptual perspective view for explaining a wireless power receiving antenna device provided in a band unit of a wearable device according to the present invention.

Meanwhile, referring to FIG. 12, a wearable device according to an embodiment of the present invention may be equipped with a wireless power receiving antenna device 1500 for charging a flexible battery over the air.

The wireless power receiving antenna device 1500 may receive power over the air in a magnetic resonance method or a magnetic induction method and charge a flexible battery.

Figure 13A:
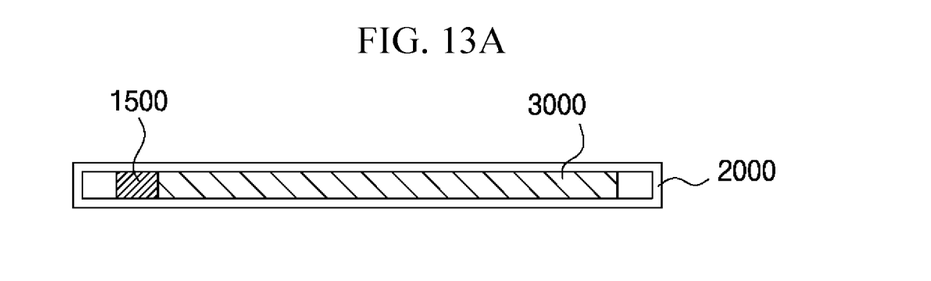
FIGS. 13A and 13B are schematic cross-sectional views for explaining a wireless power receiving antenna device provided in a band unit of a wearable device according to the present invention.
Figure 13B:
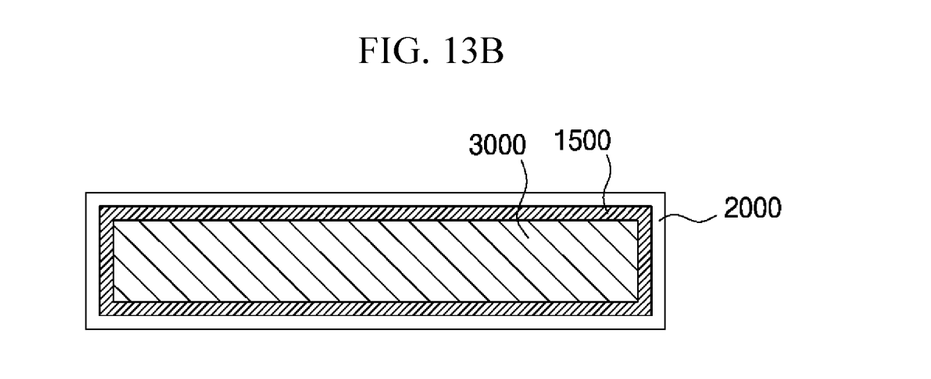

The wireless power receiving antenna device 1500 may be provided in the band unit 2000 of the wearable device according to the embodiment of the present invention. Here, the wireless power receiving antenna device 1500 may be positioned on one side of the flexible battery 3000 as shown in FIG. 13A, or may be provided along the inner surface of the band unit 2000 as shown in FIG. 13B (in this case, the wireless power receiving antenna device 1500 may be in contact with or positioned spaced apart from an outer surface of the flexible battery 3000).

Figure 14A:
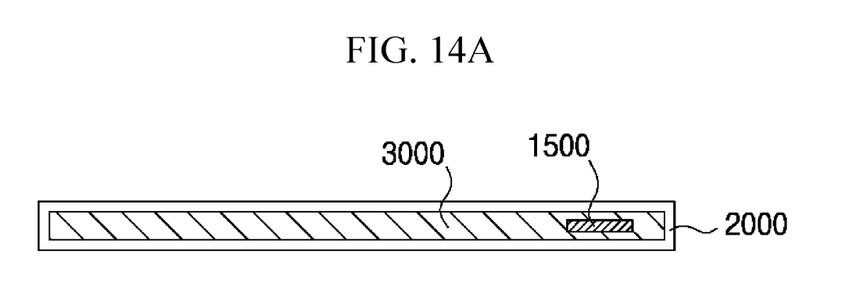
FIGS. 14A and 14B are conceptual cross-sectional views for explaining a wireless power receiving antenna device provided in a flexible battery of a wearable device according to the present invention.
Figure 14B:
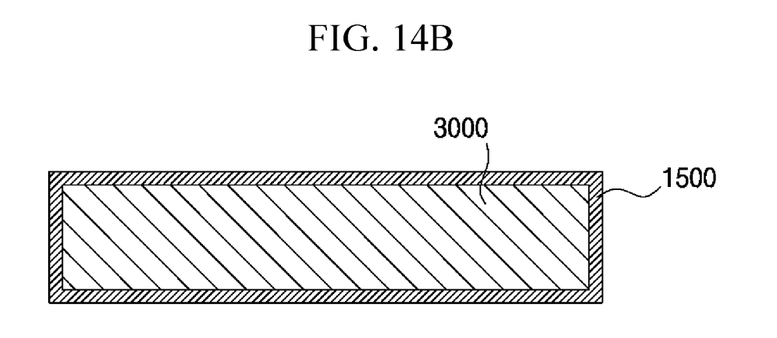

In addition, the wireless power receiving antenna device 1500 is embedded in the flexible battery 3000 (FIG. 14A), or provided on the outer surface of the flexible battery 3000 (FIG. 14B).

The wireless power receiving antenna device 1500 may include a wireless power receiving antenna and a wireless power receiving module capable of converting an AC wireless power signal received from the wireless power receiving antenna to a DC wireless power signal and charging a flexible battery with the DC wireless power signal.

The wireless power receiving antenna may employ an antenna that is implemented into an angular spiral pattern of a circular or square shape, or may also employ an antenna of a variety of patterned shapes.

The wireless power receiving module includes: a controller that controls operations of respective components for receiving an AC wireless power; and a rectifier that converts the received AC wireless power into a DC wireless power, to thus perform functions of producing various types of signals necessary for the wireless power receiving and operating in accordance with a wireless power transmission control signal corresponding to a message received from a wireless power transmission device.

As described above, the present invention has been described with respect to particularly preferred embodiments. However, the present invention is not limited to the above embodiments, and it is possible for one who has an ordinary skill in the art to make various modifications and variations, without departing off the spirit of the present invention. Thus, the protective scope of the present invention is not defined within the detailed description thereof but is defined by the claims to be described later and the technical spirit of the present invention.

INDUSTRIAL APPLICABILITY

The present invention may be applied to a wearable device including a band unit having a built-in flexible battery that is not deformed during bending, in which properties of the flexible battery are improved with flexible electrodes having excellent flexibility and electrical conductivity, to thereby have excellent reliability and increase duration of use.

The invention claimed is:

1. A wearable device having a flexible battery, the wearable device comprising:
a functional unit;
a band unit that fixes the functional unit to a wrist of a user; and
a thin plate flexible battery that is embedded in the band unit and supplies power to the functional unit,
wherein the thin plate flexible battery comprises: an electrode assembly; an electrolyte; and a packaging member that seals the electrode assembly and the electrolyte, and wherein the packaging member is configured by sequentially laminating a heat-sealable layer and a protective layer outwardly from an inner side of the packaging member,
wherein the electrode assembly comprises:
a positive electrode including a first porous nanofiber web having a plurality of first pores, the first porous nanofiber web being formed of first nanofibers which are made of electrospun and accumulated polymer material, first metal particles coated on the first nanofibers to form the first nanofibers as a first conductive support, a positive electrode active material slurry injected into the plurality of first pores, a first conductive adhesive layer formed on the first porous nanofiber web, and a first conductive metal layer formed on the first conductive adhesive layer;
a negative electrode including a second porous nanofiber web having a plurality of second pores, the second porous nanofiber web being formed of second nanofibers which are made of electrospun and accumulated polymer material, second metal particles coated on the second nanofibers to form the second nanofibers as a second conductive support, a negative electrode active material slurry injected into the plurality of second pores, a second conductive adhesive layer formed on the second porous nanofiber web, and a second conductive metal layer formed on the second conductive adhesive layer; and
a porous separator for separating the positive electrode and the negative electrode,
wherein the first nanofibers and the second nanofibers have a diameter of 0.3 to 1.5 μm, and the first porous nanofiber web and the second porous nanofiber web have a thickness of 5 to 1000 μm, and
wherein the separator comprises:
a porous nonwoven fabric playing a role of a support; and
a porous polymer web layer or a non-pore polymer film layer that is laminated on one side of the porous nonwoven fabric and playing a role of an adhesive layer and an ion moisture-containing layer when the porous polymer web layer or the non-pore polymer film layer is in close contact with the positive electrode or the negative electrode facing the porous polymer web layer or the non-pore polymer film layer.

2. The wearable device having a flexible battery of claim 1, wherein the packaging member further comprises a strength reinforcing layer bonded to the protective layer under adhesion of the adhesive layer.

3. The wearable device having a flexible battery of claim 2, wherein the strength reinforcing layer is PET.

4. The wearable device having a flexible battery of claim 1, wherein the protective layer is one of PTFE (polytetrafluororthylene), nylon, PP (polypropylene), PET (polyethylene terephthalate), PVDC (polyvinylidene chloride), PE (polyethylene), PVC (polyvinyl chloride), and EVOH (ethylene vinyl alcohol).

5. The wearable device having a flexible battery of claim 1, wherein the heat-sealable layer is a single layer structure of one of CPP (casting polypropylene), LLDPE (linear low density polyethylene), LDPE (low density polyethylene), HDPE (high density polyethylene), polyethylene, polyethylene terephthalate, polypropylene, EVA (ethylene vinyl acetate), an epoxy resin, and a phenol resin, or a laminate structure thereof.

6. The wearable device having a flexible battery of claim 1, wherein the flexible battery is insert molded and built in the band unit.

7. The wearable device having a flexible battery of claim 1, wherein the functional unit is a smart watch that performs a camera function, a voice command and memo function, a music function, a clock function, and functions such as texts and phone calls, in connection with a smart phone.

8. The wearable device having a flexible battery of claim 1, wherein a main battery is mounted in the functional unit, and the flexible battery is configured to be used as a secondary battery to charge the main battery.

9. The wearable device having a flexible battery of claim 1, wherein a positive terminal and a negative terminal of the flexible battery are protruded as male terminals at an end of the band unit, and female terminals to be coupled to the male terminals are formed in the functional unit.

10. The wearable device having a flexible battery of claim 1, further comprising: a connector that is connected to a positive terminal and a negative terminal of the flexible battery, and that is projected into one end of the band unit; and a socket into which the connector is inserted and which is formed in the functional unit to be electrically connected with the connector.

11. The wearable device having a flexible battery of claim 10, wherein the connector is used as a charging terminal for charging the flexible battery.

12. The wearable device having a flexible battery of claim 1, further comprising: a connector that is connected to a positive terminal and a negative terminal of the flexible battery, and that is projected into one of the band unit in which the other end of the band unit is fixed to one end of the functional unit; and a socket into which the connector is inserted and which is formed in the functional unit to be electrically connected with the connector.

13. The wearable device having a flexible battery of claim 1, wherein a wireless power receiving antenna device is mounted in the flexible battery or the band unit in order to charge the flexible battery in a wireless charging method.

14. The wearable device having a flexible battery of claim 1, wherein the electrolyte is a gel polymer electrolyte or a solid electrolyte that is formed by impregnating an organic electrolyte solution into the separator, in which the organic electrolyte solution is formed by mixing a gel polymer forming monomer and a polymerization initiator, and synthesizing a gel-type gel polymer by polymerization of a monomer through a gelation heat-treatment process.

15. The wearable device having a flexible battery of claim 1, wherein the positive electrode active material slurry or the negative electrode active material slurry comprises PTFE (polytetrafluoroethylene).

16. The wearable device having a flexible battery of claim 1, wherein a recess for detachably fixing the functional unit is formed in the band unit.

17. The wearable device having a flexible battery of claim 16, wherein the functional unit may be attached to and detached from the recess in an up-and-down (or vertical) direction or in a sliding manner.

* * * * *